United States Patent [19]

Purnell et al.

[11] Patent Number: 5,451,431
[45] Date of Patent: * Sep. 19, 1995

[54] COMPOSITION AND PROCESS FOR TREATING METAL SURFACES

[75] Inventors: Deborah L. Purnell; Brenda S. Morris, both of Philadelphia; David W. Reichgott, Richboro, all of Pa.

[73] Assignee: Betz Laboratories, Inc., Trevose, Pa.

[*] Notice: The portion of the term of this patent subsequent to Feb. 14, 2012 has been disclaimed.

[21] Appl. No.: 332,278

[22] Filed: Oct. 31, 1994

Related U.S. Application Data

[63] Continuation-in-part of Ser. No. 152,806, Nov. 16, 1993, Pat. No. 5,389,405.

[51] Int. Cl.6 .............. B05D 7/14; C08L 83/00; C09D 5/08
[52] U.S. Cl. .............. 427/387; 427/353; 427/384; 427/409; 427/421; 427/428; 427/434.4; 427/435; 106/14.15; 106/14.21; 106/14.41; 106/14.42; 106/14.44; 106/287.1; 106/287.11; 106/287.13; 148/243; 148/251
[58] Field of Search .............. 427/387, 353, 384, 407, 427/421, 428, 434.4, 435; 106/14.41, 14.15, 14.21, 14.42, 14.44, 287.1, 287.11, 287.13; 148/243, 251

[56] References Cited

U.S. PATENT DOCUMENTS

| | | | |
|---|---|---|---|
| 3,372,052 | 3/1968 | Polniaszek | 106/287.13 |
| 3,615,895 | 10/1971 | von Freyhold et al. | 148/256 |
| 3,649,320 | 3/1972 | Yates | 106/287.11 |
| 3,804,639 | 4/1974 | Trulsson et al. | 106/287.13 |
| 3,816,152 | 6/1974 | Yates | 106/287.13 |
| 3,832,204 | 8/1974 | Boaz | 106/287.11 |
| 4,277,284 | 7/1981 | Ginsberg et al. | 106/14.44 |
| 4,290,811 | 9/1981 | Brown et al. | 106/14.44 |
| 5,053,081 | 10/1991 | Jacob | 106/287.11 |
| 5,108,793 | 11/1991 | van Ooig et al. | 427/387 |
| 5,147,557 | 9/1992 | Purnell | 210/712 |
| 5,290,601 | 3/1994 | Brooks et al. | 427/387 |
| 5,302,659 | 4/1994 | Bindl et al. | 427/387 |

FOREIGN PATENT DOCUMENTS

WO85/05131  11/1985  WIPO.

OTHER PUBLICATIONS

Chemical Abstract 102:153135u (1985) [no month].
Plueddemann, E. P., Silane Coupling Agents, 1982, pp. 55–78, [no month].

*Primary Examiner*—Anthony Green
*Attorney, Agent, or Firm*—Alexander D. Ricci; Steven D. Boyd

[57] ABSTRACT

A non-chromate conversion coating for metal surfaces such as aluminum, steel, galvanized steel and zinc-aluminum steel consisting of an aqueous solution of a cationic polymer, an alkaline aqueous silicate and an organofunctional silane.

12 Claims, No Drawings

COMPOSITION AND PROCESS FOR TREATING METAL SURFACES

This application is a continuation-in-part of application Ser. No. 08/152,806 filed Nov. 16, 1993, U.S. Pat. No. 5,389,405.

FIELD OF THE INVENTION

The present invention relates to the process of coating metals to improve the corrosion resistance and adhesion properties of the metal's surface. Specifically, the present invention relates to a single non-chromium treatment that is equally effective on many different metal surfaces. Such metals include aluminum, steel, zinc coated steel and zinc-aluminum coated steel.

BACKGROUND OF THE INVENTION

The purpose of conversion coatings on metal surfaces are to provide corrosion resistance and improve the adhesion of the ultimate coating(s). The conversion coating improves the adhesion of final coating layers such as paints, inks, lacquers and plastics.

Traditionally, chromates have been utilized as conversion coating compounds. Chromates are known to exhibit acceptable performance on different types of metals or alloys, such as aluminum, steel, galvanized steel and zinc-aluminum coated steel. Chromate conversion coatings are typically administered by contacting the metal surface with an aqueous solution containing hexavalent or trivalent chromium ions, phosphate ions or fluoride ions. Serious concerns have been raised, however, regarding the pollution effects of the chromate or phosphate discharged into rivers or waterways by such processes. Due to the high solubility and the strongly oxidizing character of hexavalent chromium ions, conventional chromate conversion coating processes require extensive waste treatment procedures to control their discharge.

While many acceptable chromium-free conversion coatings have been developed, their utility is often limited to only one type of metal substrate. Many industrial operations, however, involve the sequential processing of different types of metals. Unless the undesirable chromium compounds are used, the industrial metal processor is forced to change the conversion coating bath for each different type of metal. This results in unacceptable downtime and higher processing costs.

It is desirable, therefore, to have a conversion coating compound which is equally effective on more than one type of metal. This is achieved by the composition and process of the present invention.

SUMMARY OF THE INVENTION

The present inventors have discovered a metal conversion coating which enhances the corrosion resistance and the adhesion properties of the surface of the metal. It provides excellent paint adhesion and corrosion resistance. The coating of the present invention is formed from an aqueous solution containing an alkaline aqueous silicate, a cationic agent and, optionally, an organofunctional silane.

DETAILED DESCRIPTION OF THE PREFERRED EMBODIMENT

The present inventors have discovered an effective method of pre-treating metal surfaces by first applying to the surface an aqueous solution of a cationic agent and an alkaline aqueous silicate followed, if desired or needed, by an aqueous organofunctional silane solution. Alternatively, all materials may be combined into a single solution and applied to the target metal surface in a single application.

The unique feature of the conversion coating composition of the present invention is that it forms an effective coating on the surfaces of metals such as aluminum, steel, zinc coated steel (galvanized) and zinc-aluminum coated steel (Galvalume ®).

The alkaline silicates used in this invention are derived from either ortho- or condensed Silicates. Water soluble salts of the following inorganic anions, in particular the sodium, potassium and ammonium salts thereof, may be used in the practice of this invention. Such compounds are:

Metasilicate—$SiO_3^{2-}$
Orthosilicate—$SiO_4^{4-}$
Disilicate—$Si_2O_5^{-2}$
Mixed Silicates—$Na_2O.xSiO_2$ (where $x=1-5$)
Aluminosilicates—$Na_2O.xAl_2O_3.ySiO_2$ (where $x+y=3-5$)

The preferred inorganic silicates are alkaline di- and meta- silicates where the ratio of $SiO_2$ to $Na_2O$ is from about 2 to 1 to about 1 to 1.

The cationic agents of the present invention are cationic polymers which are of low to medium molecular weight, have a high charge density and may be crosslinked or linear condensation or addition polymers. Their number average molecular weight ranges between 1,000 and 600,000 and they are water soluble. The charge densities, as determined by the PVSK Colloid Titration Method (H. Terayama, Kayaku no Kenkya, Vol. 1, p. 75, 1948; H. Terayama, Kayaku no Kenkya, Vol. 4, p. 31, 1949; R. Senju, "Koroido Tekiteiho", Nankodo, Tokyo, 1969), are active in the range of about 1.5 to 12.0 meq/g active polymer.

Those polymers, which have demonstrated the desired performance characteristics, are:

| Polymer | Description |
| --- | --- |
| I | Polydiallyl dimethyl ammonium chloride (available from CPS Chemical as Age Flex) |
| II | condensation product of dimethylamine plus epichlorohydrin plus ethylenediamine (available from American Cyanamid as Magnifloc 581C) |
| III | condensation product of dimethylamine plus epichlorohydrin (U.S. Pat. No. 3,738,945) |
| IV | condensation product of diethylenetriamine plus adipic acid plus epichlorohydrin (Betz Laboratories, Inc., Polymer 1175) |
| V | condensation product of hexamethylenediamine still bottoms plus ethylene dichloride plus epichlorohydrin (available from Monsanto as Santofloc F) |

The organofunctional silanes are hydrolyzed and are prepared from the respective alkoxysilanes where one or more alkoxide groups are converted to a silanol (Si—OH, or Si—O⁻) function through acid or base hydrolysis. These may be prepared from a wide variety of organofunctional alkoxysilanes. The techniques are familiar to those practiced in the art and are readily available in the literature. See, for example, E. P. Pluddemann, "Silane Coupling Agents", 2nd. ed., Plenum Press, 1991, chapter 2, herein incorporated by reference.

The organofunctional silanes which exhibit the desired utility in this invention are aminosilanes. The preferable aminosilane is a hydrolyzed aminopropyltrimethoxysilane. This compound is commercially available as an approximately 20% active aqueous solution from Huls America and is designated as Hydrosil 2627.

The alkaline silicate and cationic polymer may be applied either as a single aqueous solution, or in sequence with or without an intervening rinse step, depending on the solubilities of the materials. Concentrations are from about 0.01 to about 0.07 molar of the alkaline silicate. For the cationic polymers, a weight ratio of about from 10 to about 700 grams of polymer solids per mole of silicate is utilized. For the organofunctional silane, a weight ratio of about 5 to about 250 grams of organosilane solids per mole of silicate is utilized. The treatment solution can comprise from 0.008% to 0.2% cationic polymer, approximately 0.005% to 0.12% alkaline aqueous silicate (expressed as $SiO_2$) and approximately 0.01% to 0.25% organofunctional silane. A concentrate of the treatment solution can comprise from about 0.08% to 2% cationic polymer, from about 0.5% to 1.2% alkaline aqueous silicate and from about 1.0% to 2.5% organofunctional silane. A preferred pretreatment process comprises a solution which contains from 0.01 to 0.02 molar alkaline silicate with from 1.0 to 1.3 g/l of cationic polymer solids. This is followed by an optional water rinse and then application of a solution of 10 to 13 g/l of the organofunctional silane.

The treatment solution(s) may be applied to the metal surface to be treated by any conventional means such as spraying, wetting by dip squeegee, flow coating, roll coating and the like. Roll coating is generally preferred. The final solution of the present invention is preferably dried in place.

The following illustrative scheme summarizes the several possible sequences of application contemplated in this invention. In the scheme, "+" denotes that the agents are combined in solution, "/" denotes a separate solution or stage and "*" denotes that the step may be omitted.

alkaline silicate/rinse*/cationic polymer/rinse*/organofunctional silane alkaline silicate+cationic polymer/rinse*/organofunctional silane alkaline silicate+cationic polymer+organofunctional silane.

EXAMPLES

The present invention will now be further described with reference to a number of specific examples which are to be regarded solely as illustrative and not as restricting the scope of the present invention.

Example 1

The following test procedure was followed. Hot dipped galvanized steel panels were obtained from ACT Corp. They were spray cleaned with a hot alkaline surfactant solution in water, rinsed, passed through squeegee rolls to remove most of the water, and then spin-coated by flooding the panel surface with the solutions below. The wet panels were spun for 10 sec. after the solution was applied. The panels were dried in place on the spinner with a stream of hot air.

Comparative pretreatment solutions are as follows:

| | |
|---|---|
| A. | 15% Betz Permatreat 1006, a non-Cr pretreatment for galvanized steel containing dihydrofluorozirconic acid and an acrylic acid copolymer. |
| B. | 11% Betz Permatreat 1500, a mixed hexavalent-trivalent chromium pretreatment containing silicon dioxide. |
| C. | 15% Betz Permatreat 1500. |
| D. | 1.2% solution of the product of Example 13 of WO 85/05131 (utilizes a chromate based final rinse). |

The panels were painted with a two-coat epoxy/fluorocarbon paint system specified for galvanized steel, and cured in accordance with the manufacturer's specifications.

The adhesion and corrosion performance of the treated and painted galvanized steel were evaluated using a Wedge Bend test and a 500 hour Neutral Salt Spray test, respectively. In the Wedge Bend test, a tapered 180 degree bend in the metal is formed by first turning it to a radius of about 0.5 cm and then flattening the metal to a near zero radius. The stressed surface is then subjected to a tape pull, and the amount of paint loss (in mm) is recorded. 0 mm is perfect. Neutral Salt Spray (NSS) tests were carried out in accordance with ASTM B-117, with the scribe and rating methods following ASTM D-1654 Test Method B, Procedure A 7.2. The ratings are from 0 to 10 (10=perfect).

In some cases, a condensing humidity test was employed. This test followed the protocol of National Coil Coaters' Association Technical Bulletin No. III-3 and III-6. Blistering is rated on a scale of 0 to 10 (10=perfect).

The response of adhesion and corrosion performance from the sequential application of the silicate and the cationic polymer will be appreciated from the following table:

TABLE I

| Silicate (molar) | Polymer | Polymer g/l solids | Wedge Bend mm loss | 500 hr NSS Average Scribe Rating |
|---|---|---|---|---|
| .0125 | | 0 | 26 | 5.5 |
| .0125 | III | 0.25 | 23 | 6.0 |
| .0125 | III | 1.0 | 13 | 5.8 |
| 0 | III | 1.0 | 44 | 5.2 |
| .0125 | II | 0.31 | 26 | 5.0 |
| .0125 | II | 1.25 | 0 | 6.5 |
| 0 | II | 1.25 | 31 | 5.8 |
| Comparative Pretreatment A: | | | 11 | 5.5 |
| Comparative Pretreatment B: | | | 0 | 6.5 |

Example 2

The process of Example 1 was repeated, using calcium nitrate solution in some cases. From the following table the adhesion benefit of the calcium treatment may be seen and contrasted to the adhesion and corrosion benefit of the cationic polymer:

TABLE II

| Silicate (molar) | Second Stage | Wedge Bend mm loss | 500 hr. NSS Average Scribe Rating |
|---|---|---|---|
| 0 | none | 39 | 3.3 |
| .005 | none | 25 | 5.0 |
| .005 | .005M Ca(NO$_3$)$_2$ | 17 | 3.3 |
| .005 | .25 g/l solids Polymer III | 8 | 5.5 |
| Comparative Pretreatment B: | | 24 | 6.2 |

Example 3

The process of Example 1 was followed, except that a different topcoat paint was used. For comparison, the polymer and the silicate were applied from the same solution in some cases.

TABLE III

| First Stage | Second Stage | Wedge Bend mm loss | 500 hr. NSS Average Scribe Rating |
|---|---|---|---|
| .0125M silicate | 0.85 g/l solids of Polymer IV | 40 | 2.75 |
| .0125M silicate | 1.0 g/l solids of Polymer III | 53 | 0.5 |
| .0125M silicate | 1.25 g/l solids of Polymer II | 42 | 0 |
| .0125M silicate combined with 1.25 solids of Polymer II | | 21 | 5.25 |
| Comparative Pretreatment A: | | 41 | 6.25 |
| Comparative Pretreatment B: | | 30 | 7.25 |

Example 4

The process of Example 3 was followed, except that either an epoxy-functional silane (Huls Hydrosil 2759) or an aminofunctional silane (Huls Hydrosil 2627) was also used in some cases:

TABLE IV

| First Stage | Second Stage | Wedge Bend mm loss | 500 hr. NSS Average Scribe Rating |
|---|---|---|---|
| .0125M silicate + 1.25 g/l solids of Polymer II | 5.0 g/l Hydrosil 2627 | 10 | 8.8 |
| .0125M silicate + 1.25 g/l solids of Polymer II | 5.0 g/l Hydrosil 2759 | 25 | 5.8 |
| .0125M silicate | 1.25 g/l solids of Polymer II + 5.0 g/l Hydrosil 2627 | 25 | 6.0 |
| .0125M silicate | 1.25 g/l solids of Polymer II + 5.0 g/l Hydrosil 2759 | 23 | 0 |
| .0125M silicate + 1.25 g/l solids of Polymer II + 5.0 g/l Hydrosil 2627 | | 10 | 7.5 |
| .0125M silicate + 1.25 g/l solids of Polymer II + 5.0 g/l Hydrosil 2759 | | 45 | 4.0 |

The organofunctional silane could not be combined with the silicate without the polymer present, as it precipitated.

Example 5

The process of Example 3 was followed, using a different paint system from a different manufacturer. The primer was an epoxy and the topcoat was a siliconized polyester. The metal was pretreated using separate and combined solutions, and the aminofunctional silane was also used in some cases:

TABLE V

| First Stage | Second Stage | Third Stage | Wedge Bend mm loss | 500 hr. NSS Average Scribe Rating |
|---|---|---|---|---|
| .0125M silicate + 1.25 g/l solids of Polymer II | | | 28 | 1.0 |
| .0125M silicate + 1.25 g/l solids of Polymer II + 5.0 g/l Hydrosil 2627 | | | 27 | 6.0 |
| .0125M silicate | 1.25 g/l solids of Polymer II | 5.0 g/l Hydrosil 2627 | 24 | 6.5 |

Example 6

Three-component pretreatment solutions were prepared over a range of component concentrations in order to test the limits of solubility and efficacy. (As noted in Example 4, the organo functional silane could not be combined with the silicate unless the polymer was present, as it precipitated.) The homogeneities of the solutions were evaluated as follows:

TABLE VI

10: Clear
9: Trace light scattering
8: Moderate light scattering
7: Cloudy, but homogeneous
5: Opaque
1: Slight precipitate
0: Heavy precipitate

| Solution | Sodium Silicate (Mol/l) | Polymer II (g/l solids) | Hydrosil 2627 (g/l) | Homogeneity Rating |
|---|---|---|---|---|
| D | .01 | 4.0 | 2.0 | 9 |
| E | .04 | 1.0 | 2.0 | 0 |
| F | .01 | 1.0 | 8.0 | 9 |
| G | .04 | 4.0 | 8.0 | 7 |
| H | .01 | 2.5 | 5.0 | 10 |
| I | .025 | 2.5 | 8.0 | 8 |
| J | .01 | 1.0 | 2.0 | 9 |
| K | .04 | 1.0 | 8.0 | 0 |
| L | .025 | 4.0 | 5.0 | 8 |
| M | .01 | 4.0 | 8.0 | 9 |
| N | .063 | 6.3 | 5.0 | 7 |
| O | .063 | 6.3 | 12.5 | 5 |
| P | .063 | 2.5 | 12.5 | 0 |
| Q | .063 | 2.5 | 5.0 | 0 |
| R | .025 | 5.0 | 2.0 | 9 |

TABLE VI-continued

| | | | | |
|---|---|---|---|---|
| S | .025 | 5.0 | 8.0 | 8 |
| T | .025 | 1.0 | 2.0 | 1 |
| U | .04 | 5.0 | 2.0 | 8 |
| V | .01 | 6.3 | 12.5 | 10 |

Thus, a ratio of Polymer II to silicate greater than or equal to 100 g per mole of silicate was required for homogeneity.

Example 7

From Example 6, solutions F, G, J, M, N, O, U, and V were used in an Experimental Design study to pretreat galvanized steel, using the process of Example 5. Experimental Design Analysis is a technique familiar to those practiced in the art to maximize the information available from multivariable experiments. (These settings were used as "Inclusions" in a "D-Optimal" Experimental Design, restricted to Polymer II:silicate ratios $> = 100$ g/mol, analyzed using a quadratic model with low significance terms eliminated.)

In addition to the performance tests above, condensing humidity exposure was also evaluated per National Coil Coaters' Association Technical Bulletin No. III-3 and III-6. (A rating of 10 denotes no blistering occurred.) The test duration was 216 hours.

TABLE VII

| Solution (Example 6) | Sodium Silicate (Mol/l) | Polymer II (g/l solids) | Hydrosil 2627 (g/l) | Wedge Bend Loss (mm) | Condensing Humidity 216 hr. Avg. Rating | 500 Hr. NSS Avg. Rating |
|---|---|---|---|---|---|---|
| F | .01 | 1.0 | 8.0 | 10 | 9.0 | 7.0 |
| G | .04 | 4.0 | 8.0 | 19 | 3.5 | 6.0 |
| J | .01 | 1.0 | 2.0 | 40 | 8.0 | 7.0 |
| M | .01 | 4.0 | 8.0 | 12 | 5.0 | 5.5 |
| N | .063 | 6.3 | 5.0 | 23 | 3.0 | 4.3 |
| O | .063 | 6.3 | 12.5 | 10 | 4.5 | 4.8 |
| U | .04 | 5.0 | 2.0 | 29 | 3.0 | 3.3 |
| V | .01 | 6.3 | 12.5 | 28 | 4.0 | 5.5 |

Results of the numerical analyses indicated that preferred conditions for performance were lower concentrations of silicate and polymer, and higher concentrations of the silane. This is also apparent on comparing results for solution F vs. G, J and M.

Example 8

A concentrate suitable for dilution was prepared at five times the concentrations of the components of solution F. It was a stable, homogeneous mixture exhibiting light scattering typical of a colloid. This solution was diluted to 25% and used to pretreat galvanized steel, using the process and paint system of Example 1. The test duration for condensing humidity was 240 hours.

TABLE VIII

| Solution | Sodium Silicate (Mol/l) | Polymer II (g/l solids) | Hydrosil 2627 (g/l) | Wedge Bend Loss (mm) | Condensing Humidity 240 hr. Avg. Rating | 500 Hr. NSS Avg. Rating |
|---|---|---|---|---|---|---|
| W | .0125 | 1.25 | 10.0 | 22 | 8.5 | 8.8 |
| Comparative Pretreatment C | | | | 15 | 9.0 | 6.0 |

Example 9

In the following example, the galvanized steel test panels were prepared as in Example 8, only the pretreatments were spray applied for a 10 second contact time at ambient temperature. In some cases the components of the process were applied in separate stages, with an intervening tap water rinse. In all cases the final solution was dried in place. The separate-stage processes were preferred. Results are as follows:

TABLE IX

| First Treatment Stage | Rinse? | Second Treatment Stage | Wedge Bend Loss (mm) | 240 hr. Condensing Humidity Avg. Rating | 500 Hr. Neutral Salt Spray Avg. Rating |
|---|---|---|---|---|---|
| Solution W | No | None | 26 | 2 | 5.0 |
| 0.005M Silicate + 0.5 g/l (act.) Polymer II | Yes | 4 g/l aminopropylsilane | 7 | 20 | 6.0 |
| 0.0125M Silicate + 0.5 g/l (act.) Polymer II | Yes | 10 g/l aminopropyl silane | 25 | 10 | 6.5 |
| Comparative Pretreatment D | Yes | 2.2 g/l as CrO$_3$ | 18 | 9 | 6.5 |

Example 10

The following example shows the utility of the inventive process on aluminum. On aluminum, separate stage addition of the silicate/cationic polymer solution and the silane solution was preferred. 3003 alloy aluminum was cleaned and rinsed in the same manner as the galvanized steel in Example 8. Pretreatments were spin-applied to simulate a roll-coat film application or a dip-squeegee followed by a roll-coater. A single-coat polyester paint was applied and cured following the manufacturer's specifications. Performance tests were as described above, only Acetic Acid Salt Spray (ASTM B-287) was substituted for neutral salt spray.

TABLE X

| First Treatment Stage | Rinse? | Second Treatment Stage | Wedge Bend Loss (mm) | 240 hr. Condensing Humidity Avg. Rating | 500 Hr. Acetic Acid Salt Spray Avg. Rating |
| --- | --- | --- | --- | --- | --- |
| Solution W | No | None | 24 | 5 | 3.5 |
| 0.0125M Silicate + 0.3 g/l (act.) Polymer IV | No | 10 g/l aminopropylsilane | 10 | 9.5 | 9.5 |
| Comparative Pretreatment C | No | None | 0 | 6 | 9.3 |

Example 11

The following example shows the utility of the inventive process on zinc-aluminum coated steel (Galvalume). As for aluminum, separate stage addition of the silicate/cationic polymer solution and the silane solution was preferred. Galvalume was cleaned and rinsed in the same manner as the galvanized steel in Example 8, and the pretreatments were applied as in Example 9. A two-coat paint system (epoxy primer, polyester topcoat) was applied and cured following the manufacturer's specifications. Performance tests were as described above, using Neutral Salt Spray, and additionally evaluating the width of blistering generated during salt spray exposure at a freshly cut edge of the panel. (The ASTM D-1654 scribe ratings were 10 for all test panels.)

TABLE IX

| First Treatment Stage | Rinse? | Second Treatment Stage | Wedge Bend Loss (mm) | 240 hr. Condensing Humidity Avg. Rating | 500 Hr. Neutral Salt Spray Cut Edge Blistering |
| --- | --- | --- | --- | --- | --- |
| Solution W | No | None | 31 | 7 | 5 mm |
| 0.0125M Silicate + 0.3 g/l (act.) Polymer IV | No | 10 g/l aminopropylsilane | 34 | 7.5 | 2 mm |
| Comparative Pretreatment C | No | None | 30 | 7 | 3 mm |

What is claimed is:

1. An aqueous solution comprising from about 0.08% to 2% of a cationic polymer having a charge density of from about 1.8 to 12 meq/g active polymer and a molecular weight between about 1,000 and 600,000, from about 0.5% to 1.2% of an alkaline aqueous silicate and from about 1.0% to 2.5% of an organofunctional silane.

2. The aqueous solution of claim 1 wherein the cationic polymer is selected from the group consisting of:
   polydiallyl dimethyl ammonium chloride,
   the condensation product of dimethylamine plus epichlorohydrin plus ethylenediamine,
   the condensation product of dimethylamine plus epichlorohydrin,
   the condensation product of diethylenetriamine plus adipic acid plus epichlorohydrin, and
   the condensation product of hexamethylene diamine still bottoms plus ethylenedichloride plus epichlorohydrin.

3. The aqueous solution of claim 1 wherein the alkaline aqueous silicate is selected from the group consisting of metasilicate, orthosilicate, disilicate, $Na_2O \cdot XSiO_2$ (where $x=1-5$), and aluminosilicate.

4. The aqueous solution of claim 3 wherein the silicate comprises $SiO_2$ and $Na_2O$.

5. The aqueous solution of claim 1 wherein the organofunctional silane is hydrolyzed aminopropyltrimethyloxysilane.

6. A method of coating a metal surface comprising contacting the metal surface with an aqueous solution prepared by dilution of a concentrate containing from about 0.08% to 2.0% of a cationic polymer having a charge density of from about 1.5 to 12.0 meq/g active polymer and a molecular weight between about 1,000 and 600,000, from about 0.5% to 1.2% expressed as $SiO_2$, of an alkaline aqueous silicate, and from about 1.0% to 2.5% of an organofunctional silane.

7. The method of claim 6 wherein the cationic polymer is selected from the group consisting of:
   polydiallyldimethyl ammonium chloride,
   the condensation product of dimethylamine plus epichlorohydrin plus ethylenediamine,
   the condensation product of dimethylamine plus epichlorohydrin,
   the condensation product of diethylenetriamine plus adipic acid plus epichlorohydrin, and
   the condensation product of hexamethylene diamine still bottoms plus ethylenedichloride plus epichlorohydrin.

8. The method of claim 6 wherein the alkaline aqueous silicate is selected from the group consisting of metasilicate, orthosilicate, disilicate, $Na_2O \cdot XSiO_2$ (where $x=1-5$), and aluminosilicate.

9. The aqueous solution of claim 6 wherein the silicate contains $SiO_2$ and $Na_2O$.

10. The method of claim 6 wherein the organofunctional silane is hydrolyzed aminopropyltrimethyloxysilane 11. The method of claim 6 wherein the metal is selected from the group consisting of aluminum, steel, galvanized steel and zinc-aluminum coated steel.

12. The method of claim 6 wherein the aqueous solution is applied to the metal surface in a single step by spraying, flow coating, roll coating or wetting by dip-squeegee.

* * * * *

UNITED STATES PATENT AND TRADEMARK OFFICE
CERTIFICATE OF CORRECTION

PATENT NO.   : 5,451,431

DATED        : Sep. 19, 1995

INVENTOR(S)  : Deborah L. Purnell, et al.

It is certified that error appears in the above-identified patent and that said Letters Patent is hereby corrected as shown below:

On the title page, left-hand column, Section [*] should read as follows:

Notice: The portion of the term of this patent subsequent to November 16, 2013 has been disclaimed.

Signed and Sealed this

Thirtieth Day of January, 1996

Attest:

BRUCE LEHMAN

*Attesting Officer*    *Commissioner of Patents and Trademarks*